United States Patent
Groen et al.

(10) Patent No.: US 11,171,816 B2
(45) Date of Patent: Nov. 9, 2021

(54) PARALLEL DECISION FEEDBACK EQUALIZER PARTITIONED FOR HIGH THROUGHPUT

(71) Applicant: MELLANOX TECHNOLOGIES, LTD., Yokneam (IL)

(72) Inventors: Matan Groen, Kfar Saba (IL); Chen Gaist, Tel Aviv (IL); Hananel Faig, Jerusalem (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/943,615

(22) Filed: Jul. 30, 2020

(65) Prior Publication Data
US 2021/0044461 A1 Feb. 11, 2021

Related U.S. Application Data

(60) Provisional application No. 62/883,661, filed on Aug. 7, 2019.

(51) Int. Cl.
*H04L 25/03* (2006.01)
*H04L 7/00* (2006.01)
*H04L 7/033* (2006.01)

(52) U.S. Cl.
CPC ...... *H04L 25/03057* (2013.01); *H04L 7/0062* (2013.01); *H04L 7/033* (2013.01); *H04L 25/03038* (2013.01); *H04L 25/03885* (2013.01); *H04L 2025/0349* (2013.01)

(58) Field of Classification Search
CPC ......... H04L 25/03057; H04L 25/03038; H04L 7/0062; H04L 7/033; H04L 25/03885; H04L 2025/0349; H04L 25/4917; H04L 2025/03636
See application file for complete search history.

(56) References Cited

U.S. PATENT DOCUMENTS

| | | | |
|---|---|---|---|
| 6,192,072 B1* | 2/2001 | Azadet | H04L 25/03057 375/233 |
| 6,697,424 B1* | 2/2004 | Yang | H04L 25/03057 375/233 |
| 8,699,558 B1* | 4/2014 | Wang | H04L 25/03057 375/233 |

(Continued)

OTHER PUBLICATIONS

K. K. Parhi, "Pipelining in algorithms with quantizer loops," in IEEE Transactions on Circuits and Systems, vol. 38, No. 7, pp. 745-754, Jul. 1991, doi: 10.1109/31.135746. (Year: 1991).*

(Continued)

*Primary Examiner* — Berhanu Tadese
(74) *Attorney, Agent, or Firm* — Kligler & Associates Patent Attorneys Ltd

(57) ABSTRACT

In some disclosed embodiments, a Decision Feedback Equalizer (DFE) processes multiple symbols in parallel using a novel architecture that avoids violating a timing constraint. The DFE comprises Feed-Back (FB) filters that can be configured to equalizing nonlinear phenomena. Using a Look-Up Table (LUT)-based implementation, the FB filters may implement complex nonlinear functions at low hardware complexity, low latency and low power consumption. A LUT-based implementation of the FB filter supports adaptive FB filtering to changing channel conditions by updating LUT content.

18 Claims, 8 Drawing Sheets

(56) References Cited

U.S. PATENT DOCUMENTS

| | | | |
|---|---|---|---|
| 8,953,669 B2* | 2/2015 | Amamiya | H04B 7/005 375/233 |
| 9,077,574 B1* | 7/2015 | Healey | H04L 25/03057 |
| 9,692,618 B2* | 6/2017 | Ho | H04L 25/03146 |
| 9,699,007 B2* | 7/2017 | Ho | H04L 25/03146 |
| 2002/0122503 A1* | 9/2002 | Agazzi | H04L 25/03057 375/316 |
| 2005/0207485 A1* | 9/2005 | Lai | H04L 25/03038 375/233 |
| 2008/0049825 A1* | 2/2008 | Chen | H04L 25/03057 375/233 |
| 2011/0274154 A1* | 11/2011 | Aziz | H04L 25/03885 375/233 |
| 2014/0146867 A1* | 5/2014 | Shvydun | H04L 25/03885 375/233 |
| 2014/0169440 A1* | 6/2014 | Kotagiri | H04L 25/063 375/233 |
| 2015/0180648 A1* | 6/2015 | Francese | H04L 7/02 375/371 |
| 2015/0256363 A1* | 9/2015 | Shvydun | H04L 25/03057 375/233 |
| 2015/0381393 A1* | 12/2015 | Kotagiri | H04L 25/0292 375/233 |
| 2019/0305992 A1* | 10/2019 | Vegas Olmos | H04L 25/03057 |
| 2021/0044461 A1* | 2/2021 | Groen | H04L 25/03057 |

OTHER PUBLICATIONS

C.-K. Ng, Y.-C. Lin, W.-C. Liu, C.-F. Wu and S.-J. Jou, "A 40Gb/s All-Digital Adaptive Noise-Suppression Feed-Forward Filter and Adaptive Decision Feedback Equalizer with 40 parallelisms for 2-PAM Systems," 2018 IEEE International Symposium on Circuits and Systems (ISCAS), 2018, pp. 1-4, doi: 10.1109/ISCAS.20.*

* cited by examiner

TWO-TAP LINEAR
FB FILTER

TWO-TAP NONLINEAR FB BASED ON THIRD
ORDER POLYNOMIAL VOLTERRA SERIES

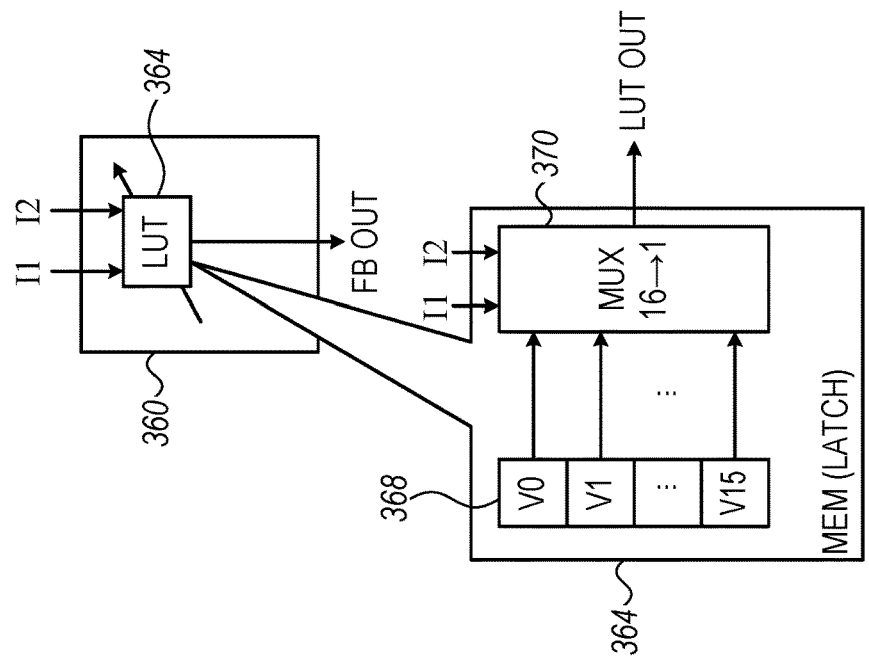
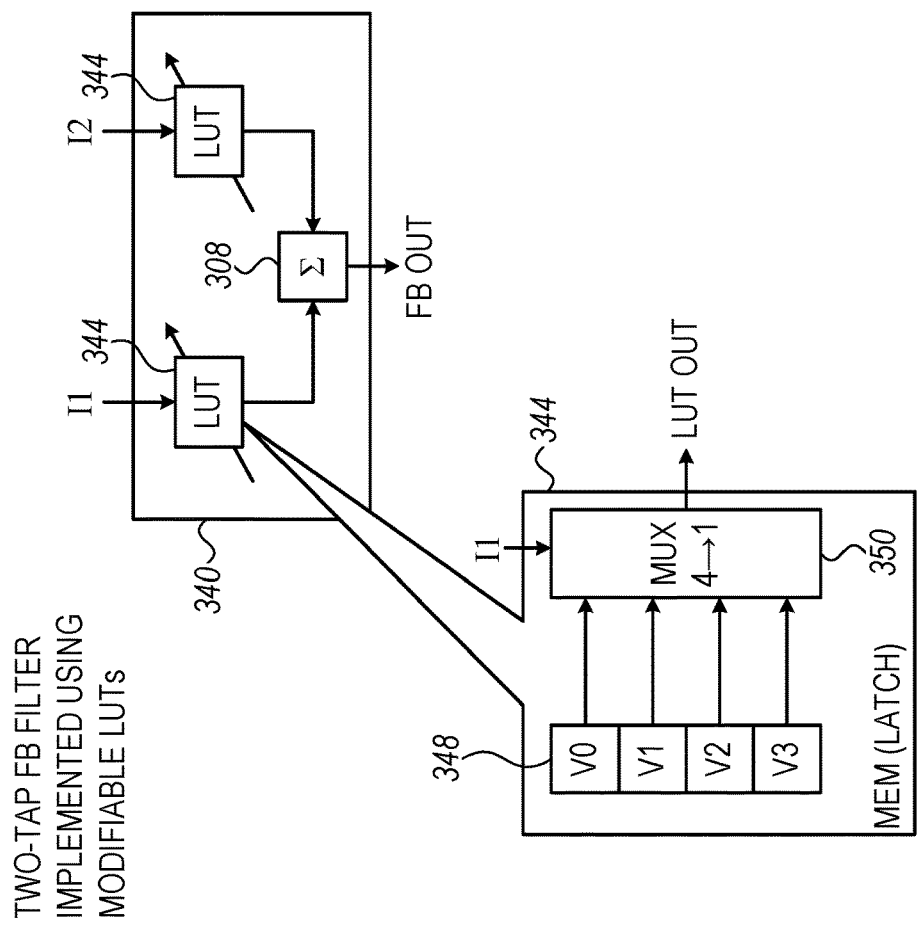
FIG. 5B
FIG. 5A

PARALLEL DECISION FEEDBACK EQUALIZER PARTITIONED FOR HIGH THROUGHPUT

CROSS-REFERENCE TO RELATED APPLICATIONS

This application claims the benefit of U.S. Provisional Patent Application 62/883,661, filed Aug. 7, 2019, whose disclosure is incorporated herein by reference.

TECHNICAL FIELD

Embodiments described herein relate generally to communication systems, and particularly to methods and systems for high-speed low-complexity decision feedback equalization.

BACKGROUND

A signal transmitted over a channel typically undergoes various impairments caused by the channel. Equalization at the receiver side aims to restore the undistorted transmitted signal. Equalizers are used, for example, for enhancing the reception quality of signals transmitted over a link connecting between network elements or network nodes in a communication system.

Methods for channel equalization are known in the art. For example, U.S. Pat. No. 9,699,007 describes a decision feedback circuit that can include a plurality of decision feedback equalizer (DFE) branches, each DFE branch including: a pre-computation stage for generating a set of tap-adjusted inputs, each tap-adjusted input corresponding to a possible value of a previous output for the same DFE branch; and a decision feedback stage including a multiplexer circuit for selecting at least one output from the set of tap-adjusted inputs based on tap-adjusted inputs from other DFE branches. For at least a first DFE branch of the plurality of DFE branches, at least one selection line for the multiplexer circuit in the decision feedback stage of at least the first DFE branch of the plurality of DFE branches is an intermediate value from a multiplexer circuit for a second DFE branch of the plurality of DFE branches.

SUMMARY

An embodiment that is described herein provides a Decision Feedback Equalizer (DFE) for filtering N symbols. The DFE includes multiple processing blocks and selection module. Each processing block includes a respective number N' smaller than N of lookahead modules, the processing blocks are arranged in groups of L processing blocks. Each processing block in a group is configured to receive (i) N' symbols selected for the group from among the N symbols, and (ii) a predefined speculative value of a DFE output, to produce, based on the N' symbols and on the predefined speculative value, N' respective lookahead values. N'−1 of the N' lookahead values are used in a chained calculation that meets a timing constraint that is not met by the chained calculation performed on N lookahead values. The selection logic is configured to select one of the L lookahead values in each group of the L processing blocks for each of the N' symbols, and to output N selected lookahead values in parallel.

In some embodiments, the lookahead modules are preceded by respective Feed Forward (FF) filters, configured to filter received symbols for producing respective FF-filtered symbols, and each of the lookahead modules is configured to produce a lookahead value based on the FF-filtered symbol. In other embodiments, the selection logic includes first selection logic assigned to a first group of L processing blocks, and second selection logic assigned to a second group of L processing blocks, the second selection logic is configured to produce from lookahead values produced by the processing blocks of the second group, intermediate lookahead values, based on lookahead values produced by the processing blocks of the first group. In yet other embodiments, each lookahead module includes a Feed Back (FB) filter, an adder, and a decision element. The FB filter is configured to receive one or more inputs, each input including a speculative value or a lookahead value, and filter the one or more inputs to produce a FB-filtered value. The adder is configured to calculate an equalized value by subtracting the FB-filtered value from an input symbol, and the decision element is configured to produce from the equalized value a lookahead value having one of multiple predefined decision values.

In an embodiment, L depends on a number of taps of the FB filter and on a number of decision values supported by the decision element. In another embodiment, the FB filter includes a nonlinear filter having a nonlinear response function. In yet another embodiment, the FB filter is implemented based on Volterra series or on a Wiener-Hammerstein model.

In some embodiments, the FB filter includes one or more Lookup Tables (LUTs) that store calculated filtered values for respective input combinations, and the FB filter is configured to filter a speculative value or a lookahead value by accessing the one or more LUTs. In other embodiments, the DFE includes a FB filter updater, configured to adapt a response function of the FB filter to minimize Inter-Symbol Interference (ISI) and distortion effects that may change over time, by modifying content of the one or more LUTs.

There is additionally provided, in accordance with an embodiment that is described herein, a method for DFE based filtering of N symbols, in a DFE that includes multiple processing blocks, each processing block including a respective number N' smaller than N of lookahead modules, the processing blocks are arranged in groups of L processing blocks, the method including, receiving by each processing block in a group (i) N' symbols selected for the group from among the N symbols, and (ii) a predefined speculative value of a DFE output. Based on the N' symbols and on the predefined speculative value, N' respective lookahead values are produced. N'−1 of the N' lookahead values are used in a chained calculation that meets a timing constraint that is not met by the chained calculation performed on N lookahead values. Using selection logic, one of the L lookahead values in each group of the L processing blocks is selected for each of the N' symbols, and N selected lookahead values are output in parallel.

These and other embodiments will be more fully understood from the following detailed description of the embodiments thereof, taken together with the drawings in which:

BRIEF DESCRIPTION OF THE DRAWINGS

FIGS. 5A and 5B are block diagrams that schematically illustrate efficient FB filter implementation using a Lookup Table (LUT), in accordance with an embodiment that is descried herein;

DETAILED DESCRIPTION OF EMBODIMENTS

Overview

Figure 1:
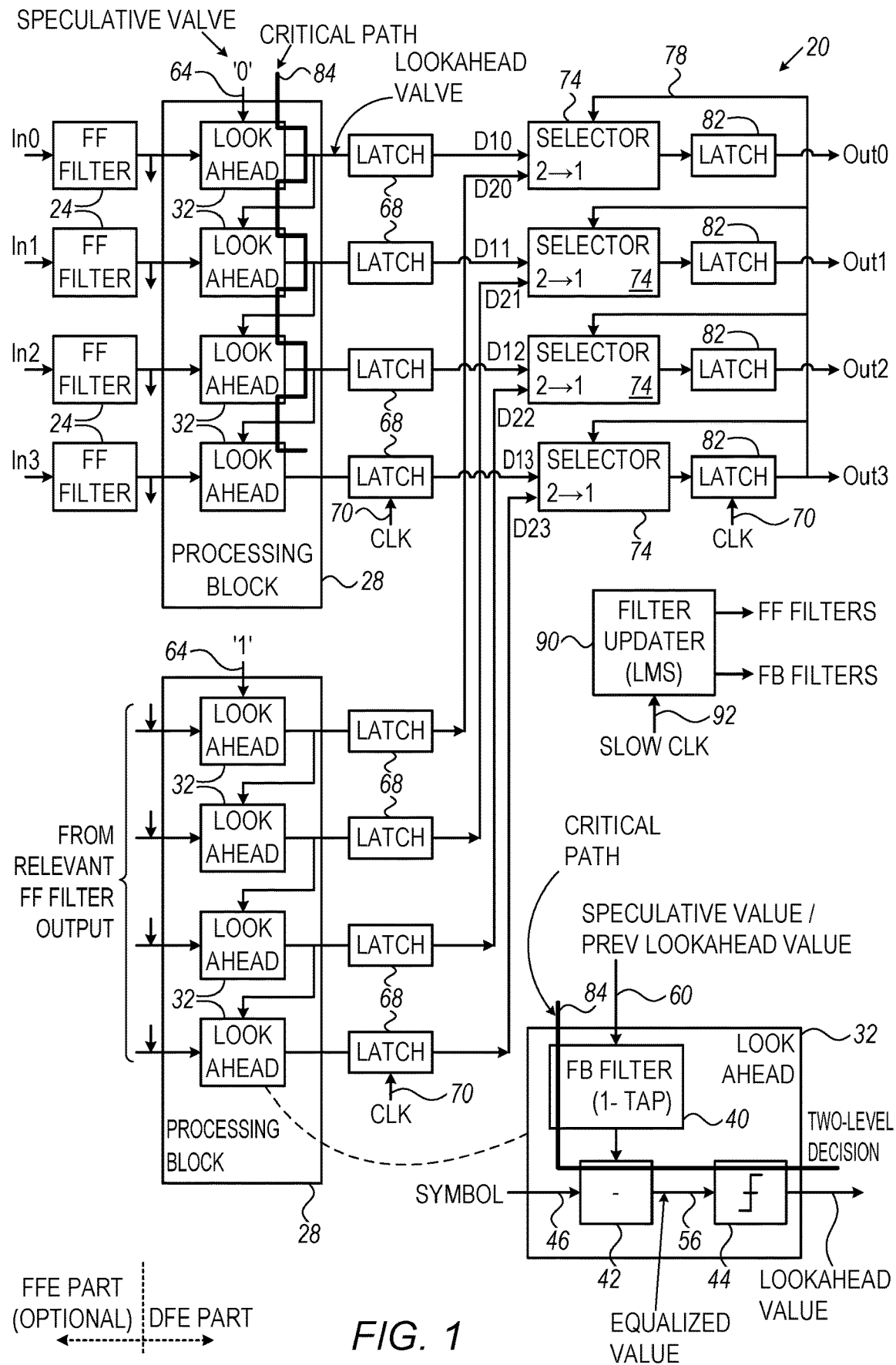
FIG. 1 is a block diagram that schematically illustrates a parallel equalizer including a Feed-Forward Equalizer (FFE) part, and a Decision Feedback Equalizer (DFE) part with lookahead precomputation, in accordance with an embodiment that is described herein.

In various communication systems, signals transmitted over a non-ideal channel arrive degraded at the receiver side. This may result in Inter-Symbol Interference (ISI), distortions, and other impairments that degrade reception quality. Channel equalization is a common technique applied at the receiver for mitigating ISI and distortion.

A Decision-feedback Equalizer (DFE) is a type of a nonlinear equalizer for reducing ISI and distortion effects based on previously decided symbols. In some applications, a combination of a Feed Forward Equalizer (FFE) and a DFE can also be used. A FFE reduces both pre-cursor ISI and post-cursor ISI, whereas a DFE typically handles only post-cursor ISI. Unlike DFE, the FFE does not require knowledge of transmitted data. The FFE may cause, however, undesirable noise enhancement, which typically does not happen with a DFE.

Embodiments that are described herein provide improved methods and circuits for high-throughput parallel decision-feedback equalization.

An important requirement in various communication applications is to include at the receiver side a low-cost, high-throughput equalizer. Such a requirement is relevant, in using high-speed Serializer/De-serializer (SERDES) elements, e.g., in Data-Center Inter- and Intra-connect (DCI) applications. Designing a fast and low-cost DFE is especially challenging when the channel causes nonlinear distortions caused e.g., by a power amplifier having a gain saturation, a Mach-Zehnder modulator applying a sine electro-optic conversion, or a Vertical-Cavity Surface-Emitting laser (VCSEL) element having a nonlinear current-light curve.

In some embodiments, to increase throughput, the DFE comprises a parallel DFE that processes multiple (e.g., N) symbols in parallel within a clock cycle. Due to the DFE feedback loop, however, the processing of a current symbol depends on a DFE decision corresponding to a previous symbol. As a result, the processing of the multiple symbols in parallel, involves a chained calculation that propagates through the processing of the multiple symbols. The chained calculation should meet a timing constraint imposed by the clock cycle period.

In the description that follows, and in the claims, the term "chained calculation" refers to a calculation that is carried out in series by multiple concatenated elements, wherein the calculation result of one element is input to the subsequent element. The chained calculation propagates along the elements unsynchronized to any clock signal.

The processing time of a chained calculation depends on the level of parallelism employed. For correct calculation, the processing time of the chained calculation should be shorter than the clock cycle period. A timing constraint thus imposes an upper limit on the number N of symbols that can be processed in parallel.

In the description that follows, and in the claims, the term "timing constraint" refers to the longest processing time allowed for the chained calculation. The timing constraint is shorter than the clock cycle period.

In the disclosed embodiments, a DFE is required to process N symbols in parallel, even though the timing constraint cannot be met by performing the chained calculation on N symbols. In some embodiments, the processing of the N symbols is divided into multiple sub-processing tasks, each task applied over a respective number N' of symbols smaller than N, so that each of the chained calculations in each of the sub-processing tasks meets the timing constraint.

In some embodiments, the DFE processing is based on calculating, for each input symbol, multiple lookahead values based on multiple respective predefined speculative values. The speculative values cover all possible combinations of output decisions that would have been fed-back in a hypothetical non-parallel DFE.

Consider a Decision Feedback Equalizer (DFE) for filtering N symbols. The DFE comprising multiple processing blocks, and selection logic. Each processing block comprising a respective number N' smaller than N of lookahead modules, the processing blocks are arranged in groups of L processing blocks, and each processing block in a group is configured to receive (i) N' symbols selected for the group from among the N symbols, and (ii) a predefined speculative value of a DFE output. The processing block is configured to produce, based on the N' symbols and on the predefined speculative value, N' respective lookahead values, wherein N'−1 of the N' lookahead values are used in a chained calculation that meets a timing constraint that is not met by the chained calculation performed on N lookahead values. The selection logic is configured to select one of the L lookahead values in each group of the L processing blocks for each of the N' symbols, and to output N selected lookahead values in parallel.

In some embodiments, each lookahead module comprises a Feed Back (FB) filter, an adder, and a decision element, wherein the FB receives one or more inputs, each input comprising a speculative value or a lookahead value, and filter the one or more inputs to produce a FB-filtered value, the adder is configured to calculate an equalized value by subtracting the FB-filtered value from an input symbol, and the decision element is configured to produce from the equalized value a lookahead value having one of multiple predefined decision values.

In some embodiments, the selection logic comprises first selection logic assigned to a first group of L processing blocks, and second selection logic assigned to a second group of L processing blocks, wherein the second selection logic is configured to produce, from lookahead values produced by the processing blocks of the second group, intermediate lookahead values, based on lookahead values produced by the processing blocks of the first group. The number L is an integer that depends on the number of taps of the FB filter and on the number of decision values supported by the decision element (slicer).

In some embodiments, each lookahead module is preceded by a Feed Forward (FF) filter, configured to filter a received symbol for producing a FF-filtered symbol. In such embodiments, the lookahead module is configured to produce the lookahead value based on the FF-filtered symbol.

The FB filter within each lookahead module may comprise a linear filter or a nonlinear filter. A nonlinear filter may be required in cases in which the channel causes nonlinear distortions. In an example embodiment, a nonlinear FB filter may be implemented based, for example, on Volterra series or on a Wiener-Hammerstein model. In alternative embodiments, other suitable methods for implementing a nonlinear FB filter can also be used. Implementation examples using polynomial Volterra series will be described further below.

The calculation within a FB filter using discrete elements such as multipliers and adders may take a relatively long time. This, in turn, limits the number of lookahead modules that can be included in a single processing block, due to the timing constraint. In some embodiments, the FB filter is implemented efficiently using one or more Lookup Tables (LUTs) that store multiple calculated filtered values for respective input combinations. The filtering time is this case reduces significantly compared to a discrete implementation of the FB filter.

In some embodiments, the FB filter in a lookahead module comprises an adaptive filter. In these embodiments, the DFE may comprise a FB filter updater for each lookahead module. The FB filer updater adapts the response function of the FB filter to minimize Inter-Symbol Interference (ISI) and distortion effects that may change over time, by modifying content of the one or more LUTs.

In the disclosed embodiments, a DFE processes N symbols in parallel using a novel architecture that avoids violating a timing constraint. The DFE comprises FB filters that can be configured to equalizing nonlinear phenomena. Using a LUT-based implementation, the FB filters may implement complex nonlinear functions at low hardware complexity, low latency and low power consumption. A LUT-based implementation of the FB filter supports adaptive FB filtering to changing channel conditions by updating LUT content.

System Description

FIG. 1 is a block diagram that schematically illustrates a parallel equalizer 20 including a Feed-Forward Equalizer (FFE) part, and a Decision Feedback Equalizer (DFE) part with lookahead precomputation, in accordance with an embodiment that is described herein.

In the present example, equalizer 20 comprises four input lines denoted In0 . . . In3 for receiving four respective symbols in parallel, and four output lines denoted Out0 . . . Out3 for outputting four decision values in parallel. In practical applications, however other suitable number of inputs/outputs can also be used.

Each of the input lines is coupled to a respective Feed-Forward (FE) filter 24 that processes a sequence of symbols received via the corresponding input line. In some embodiments, FF filter 24 comprises a (linear) Finite Impulse Response (FIR) filter having Np taps. The FF filter calculates for a sequence of Np symbols a FF-filtered symbol.

A pair of FF filters 24 that are coupled to adjacent input lines In(j), In(j+1) receive symbol sequences that are shifted one sample relative to one another. As such, the FF filter of In0 receives a sequence of symbols [X(n−2−Np) . . . X(n−3)] and the FF filter of In3 receives a sequence of symbols [X(n+1−Np) . . . X(n)]. X(n) denotes a symbol 'X' at a discrete time instance 'n'. The FF filter coupled to input line In0 thus receives the earliest symbol sequence, and the FF filter coupled to input line In3 receives the most recent symbol sequence.

In the present example, the four FF-filtered symbols produced in parallel by respective FF filters 24 are provided in parallel to two processing blocks 28, each processing block comprising four lookahead modules 32 that each corresponds to a respective input line. An example structure of lookahead module 32 is depicted at the bottom-right area of FIG. 1.

Lookahead module 32 comprises a Feed-Back (FE) filter 40, an adder 42 and a slicer 44. Lookahead module 32 receives an input symbol 46 (e.g., from a FF filter 24), and adder 42 subtracts from the value of the input symbol a FE-filtered symbol produced by FE filter 40, to produce an equalized value 56. Slicer 44 comprises a hard decision element that supports multiple predefined decision values. Slicer 44 outputs for equalized value 56 one of the predefined decision values. For example, slicer 44 selects the decision value that is closest to the equalized value. In the example of FIG. 1, slicer 44 outputs a two-level signal normalized to binary values '1' and '0', e.g., corresponding to a Pulse Amplitude Modulation (PAM)–2 signal. The decision value produced by slicer 44 is also referred to herein as a "lookahead value."

FB filter 40 receives an input signal 60 having the same discrete decision values supported by slicer 44. In the present example, FB filter 40 comprises a linear filter having a single tap, and therefore a single binary signal 60. In alternative embodiments, FB filter 40 may comprise a linear filter having two or more taps. Further alternatively, FB filter may comprise a nonlinear filter.

Lookahead module 32 calculates for symbol 46 a lookahead value under the assumption that signal 60 represents a relevant past DFE decision.

In each processing block 28, the top lookahead module receives a different respective speculative value 64, selected from among the possible slicer levels. In the embodiment of FIG. 1, the speculative values are '0' and '1' for the respective upper and lower processing blocks 28. When the speculative value '0' (or '1') is correct, the lookahead value produced by the top lookahead module serves as input (signal 60) to the FB filter of the subsequent lookahead module in that processing block. A similar argument holds for the chained calculation along the entire lookahead modules of the processing block.

Each of processing blocks 28 thus produces a respective set of four lookahead values, corresponding to speculative values '0' and '1'. Equalizer 20 comprises latches 68 that latch the eight lookahead values produced by processing blocks 28, in synchronization to a clock signal 70 denoted "CLK". The latched lookahead values corresponding to the upper processing block are denoted D10 . . . D13 and the latched lookahead values corresponding to the lower processing blocks are denoted D20 . . . D23.

Equalizer 20 comprises multiple selectors 74. Each selector 74 receives a latched lookahead value from each of processing blocks 28 and outputs one of these lookahead values based on a selection signal 78. Latches 82 further latch the four selected lookahead values, in synchronization to CLK signal 70, to produce four respective equalizer output decisions Out0 ... Out3.

Since the calculation within the top lookahead module depends on speculative value 64, and the calculation within each of other lookahead modules depends on the lookahead value produced by the preceding lookahead module, the processing block performs a chained calculation across the four lookahead modules. Within a single lookahead module, the chained calculation includes a filtering operation by the FB filter 40, a subtraction operation by adder 42 and a decision operation by slicer 44.

Let T1 denote the calculation time within a single lookahead module. The overall time of performing the chained calculation is therefore given (at least approximately) by $T=4 \cdot T1$, in this example. The chained calculation should be carried out sufficiently fast to meet a timing constraint as explained herein. Specifically, let Tc denote the cycle period of CLK signal 70, and let Ts denote the setup time of latches 68. The timing constraint in the present example is given by $4 \cdot T1+Ts<Tc$. In other words, for correct results, the chained calculation should be completed within a (Tc-Ts) time-period. In FIG. 1, an emphasized line 84 depicts the critical path via the lookahead modules. Embodiments in which the overall number of symbols for parallel DFE processing is divided among multiple processing blocks for meeting the timing constraint will be described in detail further below.

In some embodiments, FF filter 24, FB filter 40 or both have a modifiable response function. For example, the FF filter, FE filter or both comprise modifiable coefficients. This is useful, for example, for adapting the response functions of the FF and FB filters to a changing channel. In such embodiments, equalizer 20 comprises a filter updater 90 that adaptively modifies the coefficients of the FF filter and/or FB filter for reducing the error between the actual output and a reference signal.

Filter updater 90 may apply any suitable optimality criterion for adapting the filter coefficients, e.g., using the Least Mean squares (LMS) method, which minimizes a Mean Squared Error (MSE) cost function. As will be described below, EB filter 40 may be implemented efficiently using one or more Lookup Tables (LUTs). In such embodiments, filter updater 90 adaptively modifies the content of the LUT(s). In some embodiments, filter updater 90 operates at a slower rate than the equalizer data path, e.g., using a clock signal 92 that is much slower than CLK signal 70. The ratio between clock signal 92 and CLK signal 70 is application and implementation dependent. The adaptation rate, however, should be sufficiently fast to track channel behavior.

Parallel DFE Structure for Meeting Timing Constraint

Figure 2:
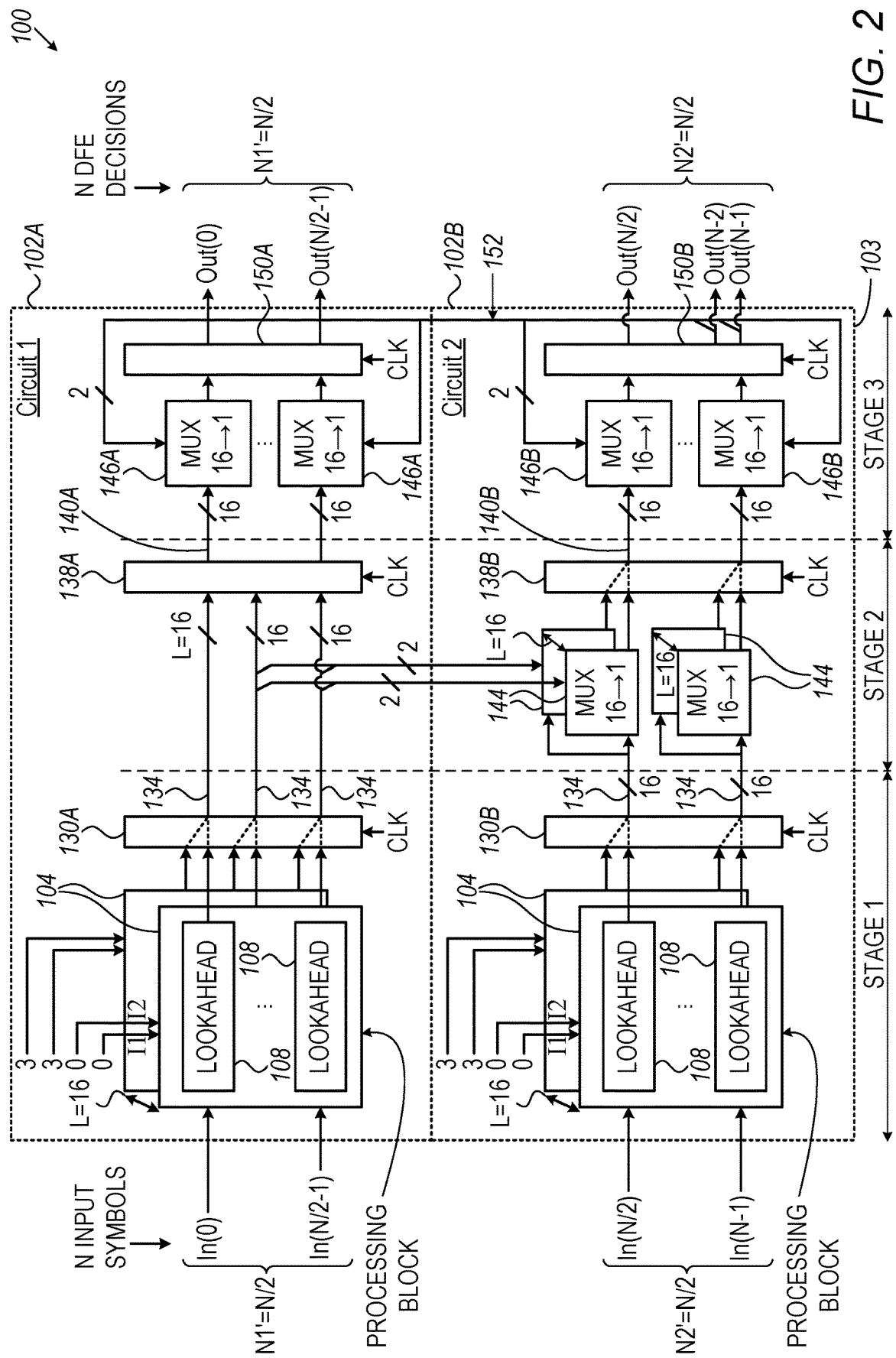
FIG. 2 is a block diagram that schematically illustrates a parallel DFE that meets a timing constraint, in accordance with an embodiment that is described herein.
Figure 2:
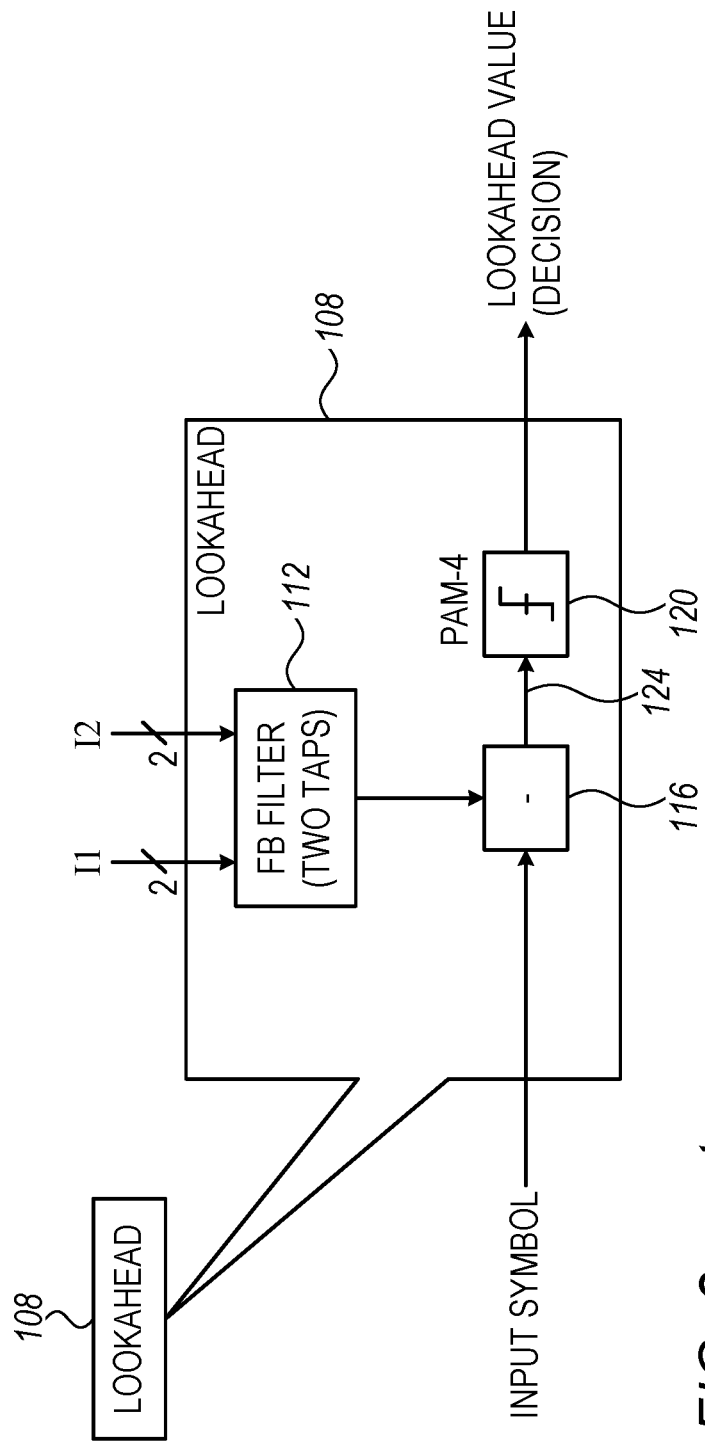

FIG. 2 is a block diagram that schematically illustrates a parallel DFE 100 that meets a timing constraint, in accordance with an embodiment that is described herein.

DFE 100 comprises N input lines denoted In(0) ... In(N−1) for receiving N symbols in parallel, and N output lines denoted Out(0) ... Out(N−1) for outputting N decision values in parallel. In the present example, the group of N input lines (or symbols) and the group of N output lines (or decision values) are each divided into two subgroups comprising N1 and N2 input lines or output lines, wherein N1+N2=N. In the example of FIG. 2, N is an even number and N1=N2=N/2. In alternative embodiments, N1 and N2 may comprise different integer numbers. As will be described below, each of N1 and N2 should meet a common timing constraint imposed on the chained calculation in each processing block.

DFE 100 comprises Circuit1 (102A) that processes in parallel N1 symbols received via input lines In(0) ... In(N/2−1) and Circuit2 (102B) that processes N2 symbols received via input lines In(N/2) ... In(N−1). The processing in Circuit1 and Circuit2 is carried out in a three-stage pipelined, in which the stages are denoted STAGE1, STAGE2 and STAGE3. Each of the pipeline stages is terminated by a latch, as will be described below.

The processing within STAGE1 is essentially the same for both Circuit1 and Circuit2. In Circuit1, input lines In(0) ... In(N/2−1) are coupled in parallel to L=16 processing blocks 104. The selection of the L to a value 16 will be explained below. Similarly, in Circuit2, input lines In(N/2) ... In(N−1) are coupled in parallel to L=16 other processing blocks 104. Each processing block 104 in Circuit1 (or Circuit2) comprises N1 (or N2) lookahead modules 108, respectively.

In the example embodiment of FIG. 2, lookahead module 108 comprises a two-tap linear FB filter 112, an adder 116 and a slicer 120. EB filter 112 receives two inputs denoted I1 and I2, an input for each tap. Using I1 and I2, the FB filter calculates a filtered symbol that adder 116 subtracts from an input symbol received in the lookahead module via a corresponding input line, to produce an equalized value 124. Slicer 120 selects for equalized value 124, a decision value from among four predefined decision values. The slicer may select a decision value that is closest to the equalized value among the four predefined decision values. The signal output by lookahead module 108 comprises a PAM-4 signal. In the example of FIG. 2, the slicer supports decision values 0, 1, 2 and 3. In alternative embodiments, other suitable slicers can also be used, e.g., supporting a different set of decision values. For example, other numbers of decision values and/or other decision values can also be used.

Since in the present example, the decision values have four possible values, the inputs I1 and I2 to the EB filter also have the same four possible values, and therefore each of I1 and I2 comprises a two-bit binary input.

The top lookahead module 108 in a processing block 104 receives in its I1 and I2 inputs two speculative values, each in the range of integers 0 ... 3. I1 and I2 represent output decisions that are one symbol apart from one another, I1 preceding I2. Each subsequent lookahead module in the processing block receives at its I1 input, the I2 input to the preceding lookahead module, and receives at its I2 input the lookahead value produced by the preceding lookahead module. The chained calculation in the processing block thus propagates down along the lookahead modules of the block.

In the example of FIG. 2, FB filter 112 comprises Np=2 taps, each corresponds to a respective input (e.g., I1 or I2) having N1=4 possible values. The total number L of combinations derived from inputs I1 and I2 is given by L=(Np)N1, which in FIG. 2 results in L=16 combinations. Each of the L=16 combinations of speculative values 00, 01, ..., 33, is input to the I1 and I2 inputs of the top lookahead module of a different processing block among the L=16 processing blocks corresponding to the same input lines. For each input line, the L processing blocks produce L lookahead values, each of which corresponds to a respective speculative value combination.

A latch 130A latches L lookahead values corresponding to a common input line to produce N1 groups 134 of L=16 lookahead values in Circuit1. Similarly, a latch 130B latches L lookahead values corresponding to a common input line to produce N2 groups 134 of L=16 lookahead values in Circuit2. This latching operation concludes the STAGE1 processing.

The processing in STAGE2 differs between Circuit1 and Circuit2, as described herein. In Circuit1, a latch 138A laches the N1-by-L lookahead values that were latched by latch 130A.

In Circuit2, each Group 134 of L=16 lookahead values is provided to L multiplexers 144 in parallel. For propagating the selection of the lookahead values to Circuit2, two most recent lookahead values (148) produced in Circuit1 in the previous clock cycle, are used for selecting one of the L lookahead values in a group 134. This scheme extends the chained calculation from Circuit1 to Circuit2. Specifically, L multiplexers 144 are assigned per input line for selecting one lookahead value out of L lookahead values in a group 134. Each multiplexer 144 selects a lookahead value based on a different respective pair of most recent lookahead values 148 produced in Circuit1.

A latch 138B latches groups of L lookahead values selected by L respective multiplexers 144 corresponding to a common input line. Latch 138B outputs N2 groups 140B of L lookahead values. The latching operations of latches 138A and 138B concludes the STAGE2 processing. Note that Latch 138A in circuit1 creates a one CLK cycle delay to compensate for the delay created in Circuit2.

The STAGE3 processing is similar in both Circuit1 and Circuit2. In Circuit1, each of N1 multiplexers 146A, selects one lookahead value among L lookahead values of a relevant group 140A. A latch 150A latches the N1 selected lookahead values to produce N1 decision outputs. Similarly, in Circuit2, each of N2 multiplexers 146B, selects one lookahead value among L lookahead values of a relevant group 140B. A latch 150B latches the N2 selected lookahead values to produce N2 decision outputs. The most recent decision outputs denoted Out(N−1) and Out(N−2) 152 are used for selection in each of multiplexers 146A and 146B.

In DFE 100, the chained calculation in each processing block meets a timing constraint that is not met by the chained calculation performed on N lookahead values. The timing constraint requires that N'·T1<Tc-Ts, wherein N' is the number of lookahead modules in each respective processing block, T1 is the processing time of a single lookahead module, Tc is the cycle period of the CLK signal, and Ts is the setup time of latches 130A and 130B. In the example of DEF 100, N symbols are split into N1 symbols to be processed by Circuit1 and N2 symbols to be processed by Circuit2. N1 and N2 may be different from one another. For example, for N=9, N1 and N2 may be selected as N1=6 and N2=3, assuming that the timing constraint is met for N1=6. In alternative embodiments, the N symbols may be split into more than two subgroups.

A DFE for Processing 56 Symbols in Parallel

Figure 3:
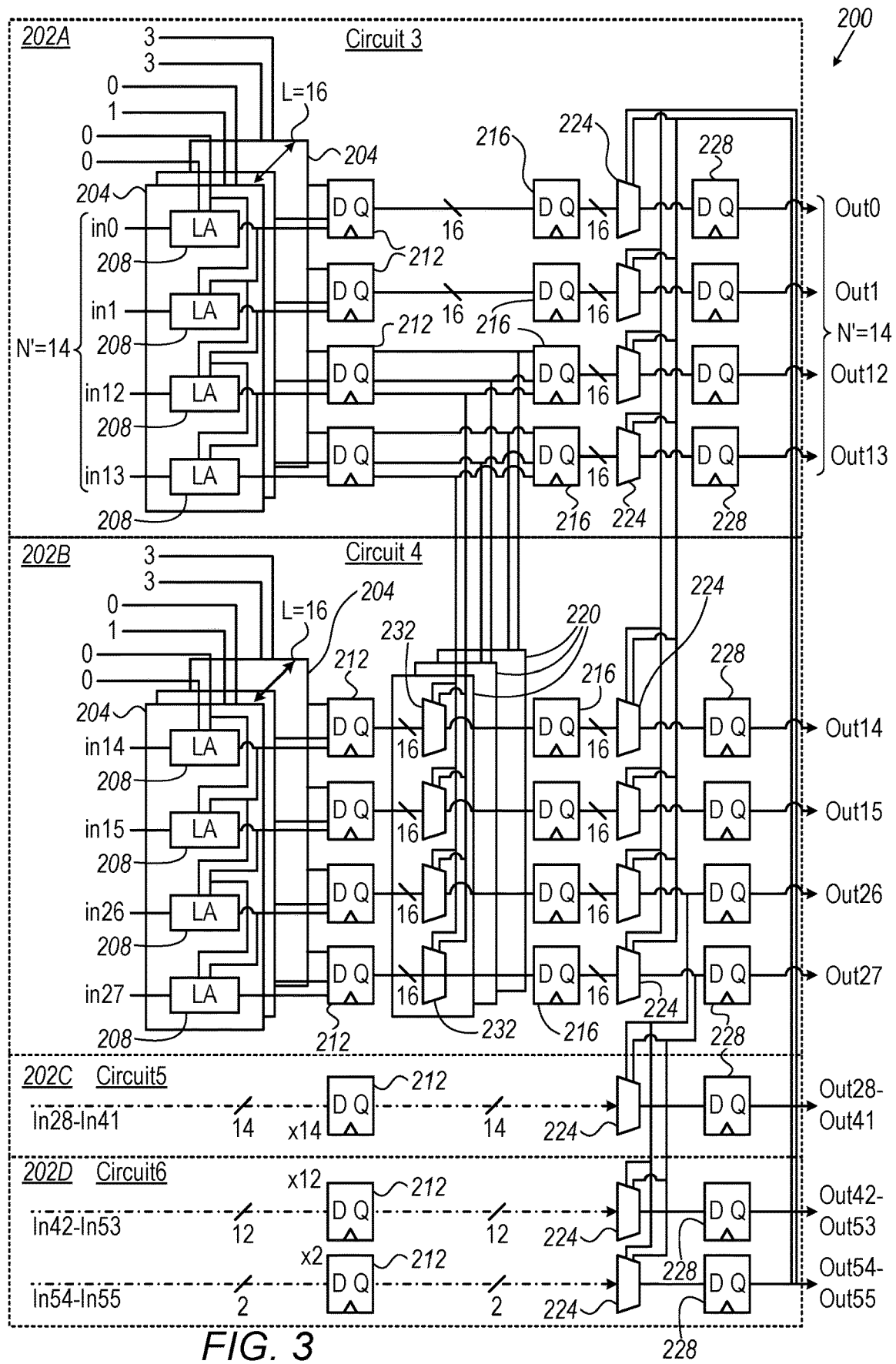
FIG. 3 is a block diagram that schematically illustrates a DFE that processes a plurality of symbols using multiple processing circuits operating in parallel, in accordance with an embodiment that is described herein.

FIG. 3 is a block diagram that schematically illustrates a DFE 200 that processes a plurality of symbols using multiple processing circuits operating in parallel, in accordance with an embodiment that is described herein. DFE 200 can be used, for example, in Serializer/De-serializer (SERDES) elements used for communication over communication links, e.g., in a datacenter. DFE 200 supports a data rate of 112 Gigabit per second by delivering a parallel bus of 56 PAM-4 symbols at a rate of 56 Giga Baud.

DFE 200 receives N=56 symbols over input lines denoted In0 . . . In55. DFT 200 processes the 56 symbols in parallel and produces N=56 output decision values over output lines Out0 . . . Out55. It is assumed that the chained calculation of lookahead values as described above is not met over 56 lookahead values, and therefore needs to be broken into multiple (four in the present example) concatenated chained calculations.

In the example embodiment of FIG. 3, DFE 200 comprises four processing circuits 202A . . . 202D, respectively denoted Circuit3, Circuit4, Circuit5 and Circuit6. Each of the four processing circuits receives N'=14 symbols via N'=14 respective input lines, in parallel, and produces N'=14 decision values over N'=14 respective output lines.

In FIG. 3, Circuit5 is similar to Circuit3, and Circuit6 is similar to Circuit4. The block diagrams of Circuit3 and circuit4 are depicted in detail, whereas Circuit5 and Circuit6, are depicted schematically, for clarity. In Circuit5, a latch 112 represent 14 latches and multiplexer 244 represents 14 multiplexers, corresponding to input lines In28 . . . In41. In Circuit6, an upper latch 212 and an upper multiplexer 244 represent 12 latches and 12 multiplexers corresponding to input lines In42 . . . In53, and a lower latch 212 and a lower multiplexer 244 represent two latches and two multiplexers corresponding to input lines In54 and In55.

Circuit3 and Circuit5 of FIG. 3 have the same configuration, which is also similar to the configuration of Circuit1 of FIG. 2 with N1 set to 14. Circuit4 and Circuit6 of FIG. 3 have the same configuration, which is also similar to the configuration of Circuit2 of FIG. 2, with N2 set to 14.

Each of Circuit1 . . . Circuit4 comprises L=16 processing blocks 204, each of which comprising N'=14 lookahead modules 208 coupled to N'=14 respective input lines. Lookahead module 208 is denoted "LA" int eh figure. In the present example, lookahead module 208 comprises a two-tap FB filter and a four-level slicer (not shown). Lookahead module 208 can be implemented, e.a., using lookahead module 108 of FIG. 2. In alternative embodiments, lookahead module 208 may comprise any other suitable FE filter such as a FB filter having a number of taps other than two, and/or a nonlinear FB filter, for example.

As explained in describing FIG. 2 above, the two-tap FB filter of the top lookahead module in each processing block, receives a combination of Np speculative values, wherein Np is the number of FB filter taps (Np=2 in FIG. 3). In the present example, the slicer has four decision levels, and each speculative value is in the range 0 . . . 3. The FB filter of the subsequent lookahead module (from the top) receives a speculative value and a lookahead value produced by the top lookahead module. FB filters of subsequent lookahead modules in the processing block receive two lookahead values produced by two preceding lookahead modules in the processing block. The chained calculation of lookahead values in each processing block meets the timing constraint.

As will be described below, the chained calculation in circuit3 is concatenated to that of Circuit4 by latching the two last lookahead values in Circuit3 and using them in Circuit4 one clock cycle later. (In FIG. 3 the clock signal to latches is omitted, for clarity).

Each processing block 204 is coupled to N'=14 latches 212, each of which latches L=16 lookahead values produced by L=16 lookahead modules coupled to a common input line.

Similarly to DFE 100 of FIG. 2, DFE 200 operates in a three-stage pipeline configuration, wherein the middle stage differs between Circuit3 and Circuit4 and similarly between Circuit5 and Circuit6. In Circuit3 and Circuit5, latches 216 re-latch the lookahead values output by latches 212, thus creating a one clock cycle delay. In circuit4 and Circuit6, latches 216 latch the outputs of multiplexer blocks 220 that will be described below. Each of latches 216 outputs L=16 lookahead values.

Each of Circuit3 . . . Circuit6 comprises N'=14 multiplexers 224 for selects one out of the L=16 lookahead values output by a latch 216. The N'=14 output latches 228 latch the outputs of multiplexers 224 to produce N'=14 respective output decisions. Each of multiplexers 224 in Circuit3 and Circuit4 selects one out of L=16 lookahead values, based on the two most recent outputs Out54 and Out55. Each of multiplexers 224 in Circuit5 and Circuit6 selects one of L=16 lookahead values, based on the two most recent pre-latched outputs Out26 and Out27.

As noted above, the middle stage in each of Circuit4 and Circuit6 comprises L=16 multiplexer blocks 220. Each multiplexer block comprises N'=14 multiplexers 232. A multiplexer 232 receives L=16 lookahead values from a latch 212 corresponding to a relevant input line and selects one of these L=16 lookahead values to be latched by a latch 216.

In in Circuit4 (or Circuit6), multiplexers 232 select lookahead values to output based on two lookahead values that were latched in the previous clock cycle by latches 212 of Circuit3 (or Circuit5). A pair of lookahead values received from Circuit3 (or Circuit5) comprise the most recent lookahead values corresponding to In12 and In13 of Circuit3 (or In40 and In41 of Circuit5). Each multiplexer block 220 in Circuit4 (or Circuit6) receives the two lookahead values from a different respective processing bock 204 of Circuit3 (or Circuit5). This scheme extends the determination of lookahead values from Circuit3 to Circuit4 (and from Circuit5 to Circuit6) using the middle stage multiplexers 232.

FB Filter Implementation Examples

Figure 4A:
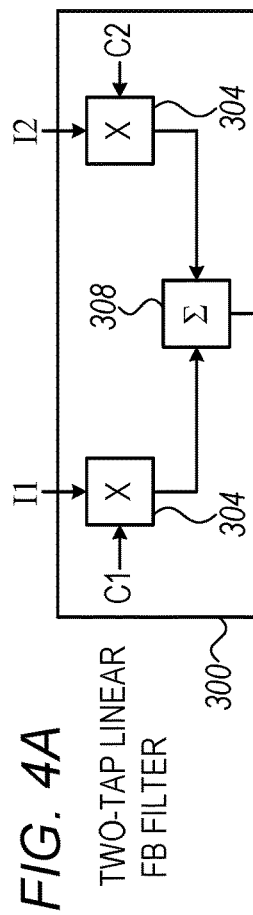
FIGS. 4A and 4B are block diagrams that schematically illustrate example configurations of a two-tap Feed Back (FB) filter used in a lookahead module of a parallel DEE, in accordance with an embodiment that is described herein.
Figure 4B:
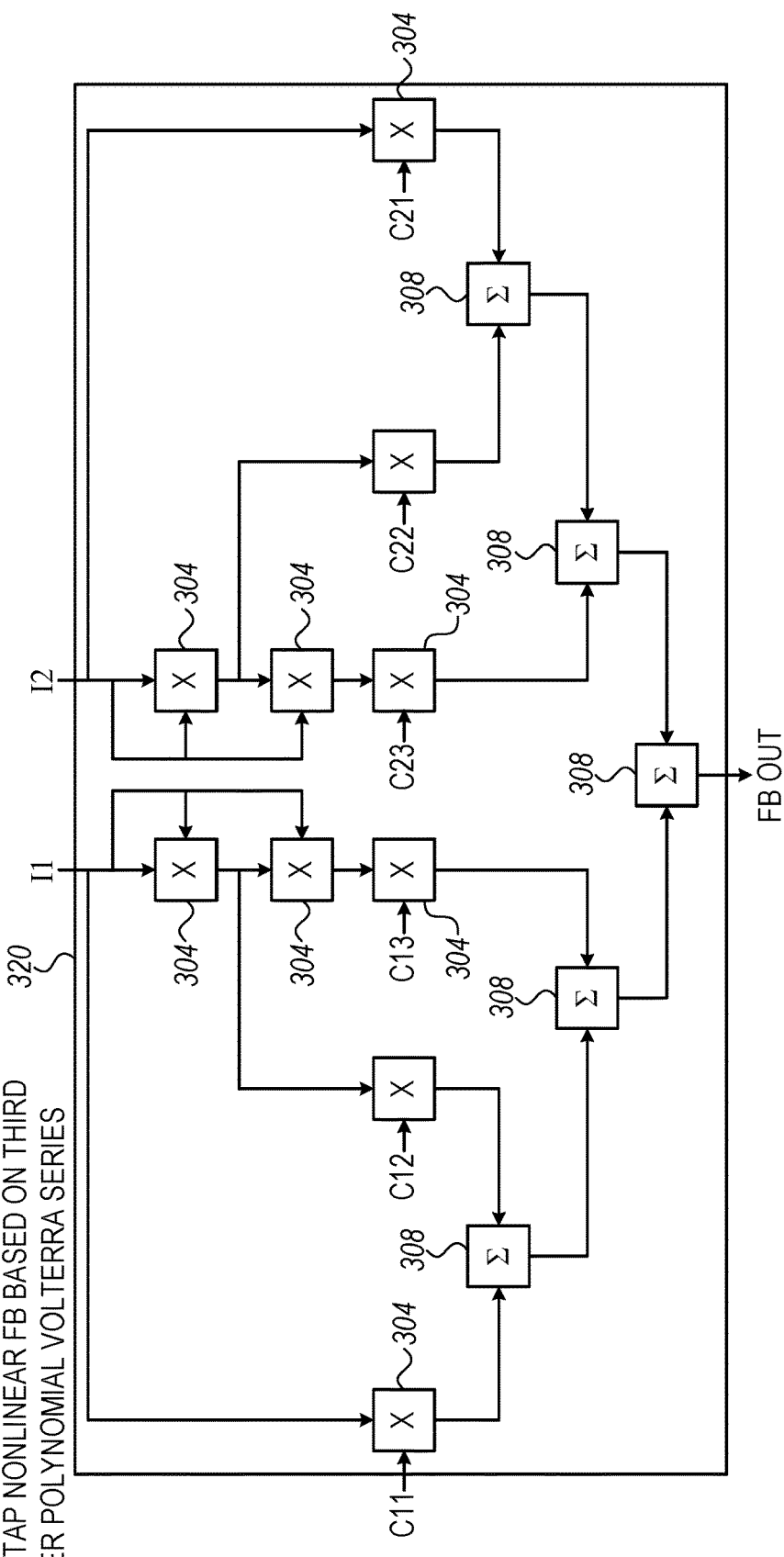

FIGS. 4A and 4B are block diagrams that schematically illustrate example configurations of a two-tap Feed Back (FB) filter used in a lookahead module of a parallel DFE, in accordance with an embodiment that is described herein.

In FIG. 4A, a FB filter 300 comprises a two-tap linear filter. The two taps are associated with two respective coefficients denoted C1 and C2, corresponding to two FB filter inputs I1 and I2. FB filter 300 comprises multipliers 304 and an adder 308. FB filter 300 calculates a filtered output as given by, $$FB\ out = C1 \cdot I1 + C2 \cdot I2 \quad \text{Equation 1}$$

In FIG. 4B, a FB filter 320 comprises a two-tap nonlinear filter. In the present example, FB filter 320 implements a third order polynomial Volterra filter, using polynomial coefficients denoted C11, C12, C13, C21, C22 and C23. FB filter 320 comprises multiple multipliers 304 and multiple adders 308, and is configured to calculate a filtered output as given by, $$FB\ out = C11 \cdot I1 + C12 \cdot I1^2 + C13 \cdot I1^3 + C21 \cdot I2 + C22 \cdot I2^2 + C23 \cdot C23 \cdot I2^3 \quad \text{Equation 2}$$

FIGS. 5A and 5B are block diagrams that schematically illustrate efficient FB filter implementation using a Lookup Table (LUT), in accordance with an embodiment that is descried herein.

In FIG. 5A, a FB filter 340 comprises two LUTs 344 corresponding to two respective inputs I1 and I2 having four discrete values. Each LUT 344 holds four values denoted V0 . . . V3, and outputs a partial filter calculation corresponding to I1 or I2, respectively. An adder 308 sums the outputs of the two LUTs to produce the FB out result.

In the present example, LUT 344 holds the four values in a nonvolatile memory, e.g., a four-cell latch. In some embodiments, the four values are precalculated once and stored in the LUT. In other embodiments, FB filter 340 comprises an adaptive filter, in which case the four values in the LUT are updated over time. Example LMS-based LUT adaptation will be described in detail below. LUT 344 further comprises a multiplexer 350 that selects one of the four values based on the input I1 (or I2).

In FIG. 5B, a FB filter 360 comprises a single LUT 364 that implements the entire filtering calculation for the inputs I1 and I2. LUT 364 may comprise a memory (e.g., a latch) and a multiplexer 370, similarly to LUT 344. In LUT 364, however, the LUT stores 16 values, corresponding to the 16 possible combinations of the inputs I1 and I2, and multiplexer 370 selects one of the 16 values based on both I1 and I2. The content of LUT 364 may be adapted over time to changing channel conditions.

Using LUTs, the FB filter can efficiently implement a highly complex nonlinear function, e.g., a polynomial Volterra filter as depicted in FIG. 4B above. The LUT-based FB filter (e.g., 340 and 360) has low complexity, low latency, and low power consumption. The LUT-based FB filter calculates a filtered value at the rate of CLK, signal (70), which due to the parallel processing is much slower than the symbol rate. Moreover, as will be described below, the LUT can be adapted to a channel that changes over time. A LUT-based FB filter (e.g., such as 340 and 360) is thus suitable for use in a DFE coupled to a SERDES element.

Adaptive LUT-Based FB Filter

Figure 6:
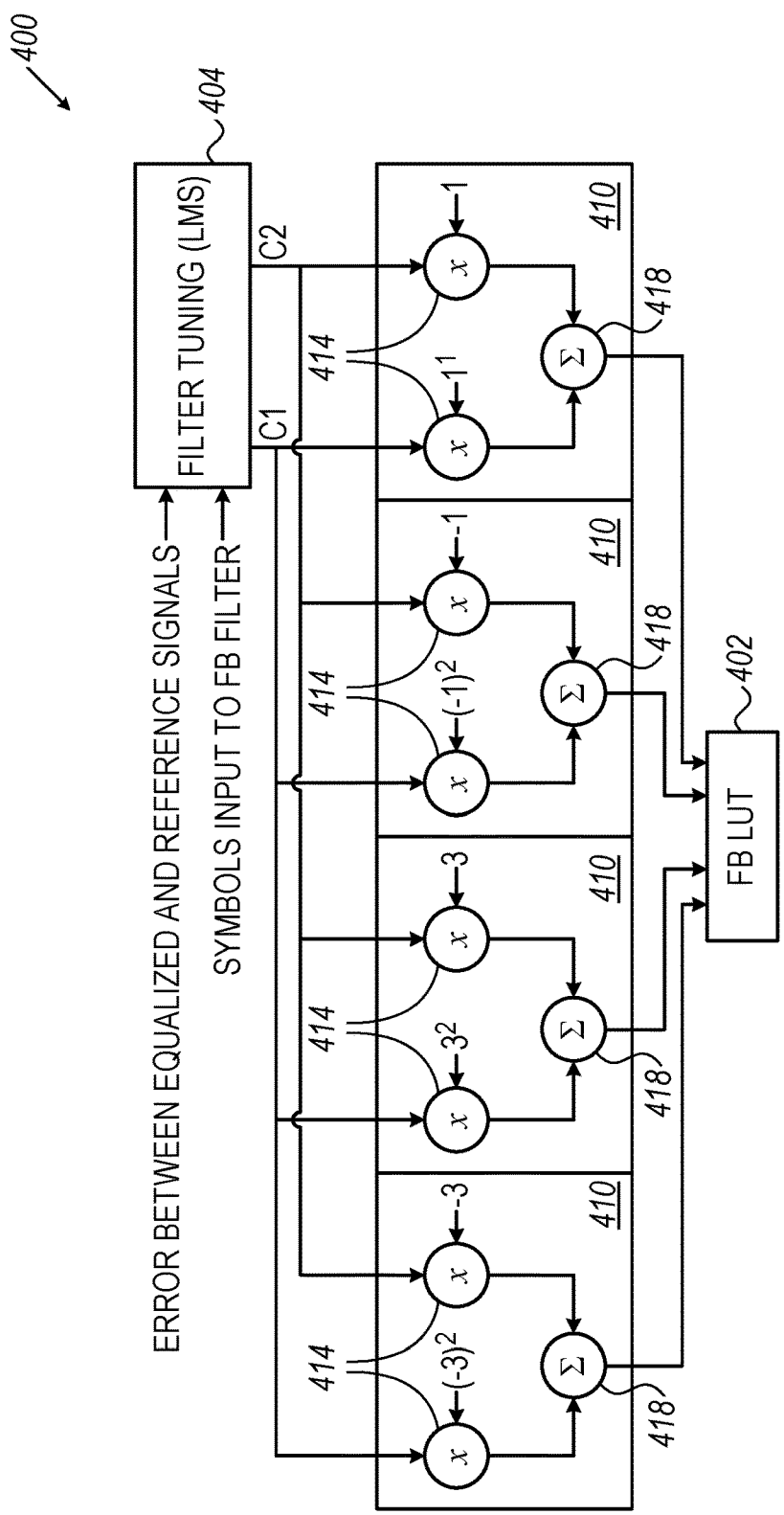
FIG. 6 is a block diagram that schematically illustrates a circuit used for updating a LUT of an adaptive FB filter, in accordance with an embodiment that is described herein.

FIG. 6 is a block diagram that schematically illustrates a LUT updating circuit 400 used for updating a LUT 402 of an adaptive FE filter, in accordance with an embodiment that is described herein.

In the present example, the underlying FB filter (e.g., FE filter 340 of FIG. 5A) comprises a nonlinear filter having a nonlinear response function, based on a second order polynomial Volterra series. The FB filter comprises a LUT 402 for each of inputs I1 and I2, similarly to the configuration of FIG. 5A above. The four values stored in the LUT corresponding to the four discrete values of the I1 input (and similarly to the I2 input) is given by:

$$LUT\ out = C1 \cdot I1 + C2 \cdot I1^2 \quad \text{Equation 3}$$

In the present example, the inputs I1 and I2 have four discrete values [1, −1, 3, −3].

LUT updating circuit 400 comprises a filter tuning module 404 that receives (i) the symbols inputs to the FE filter (e.g., I1 or I2) and (ii) an error signal between the equalized signal (input to the slicer of the lookahead module) and a reference signal, e.g., decisions at the slicer output. Filter tuning module 404 outputs updated coefficient values C1 and C2 (e.g., of Equation 3) that are calculated for optimal performance of the FE filter. In some embodiments, filter tuning module 404 updates the coefficient values C1 and C2 using the Least Mean Squares (LMS) method. In alternative embodiments, however, other suitable methods using other optimality criteria can also be used.

LUT updating circuit 400 comprised four sub-circuits 410, each sub-circuit comprising multipliers 414 and an adder 418. Each of sub-circuits 410 calculates Equation 3 above for a respective value of 11. The outputs of sub-circuits 410 are then stored in a FB LUT 420.

The calculation of Equation 3 (or other suitable equation, depending on the filter function) is typically complex and takes a relatively long time. Consequently, the updating rate of the LUT is typically much lower than the clock signal rate. The LUT updating rate, however, should be sufficiently high to track the changing behavior of the channel.

Method For Performing DFE

Figure 7:
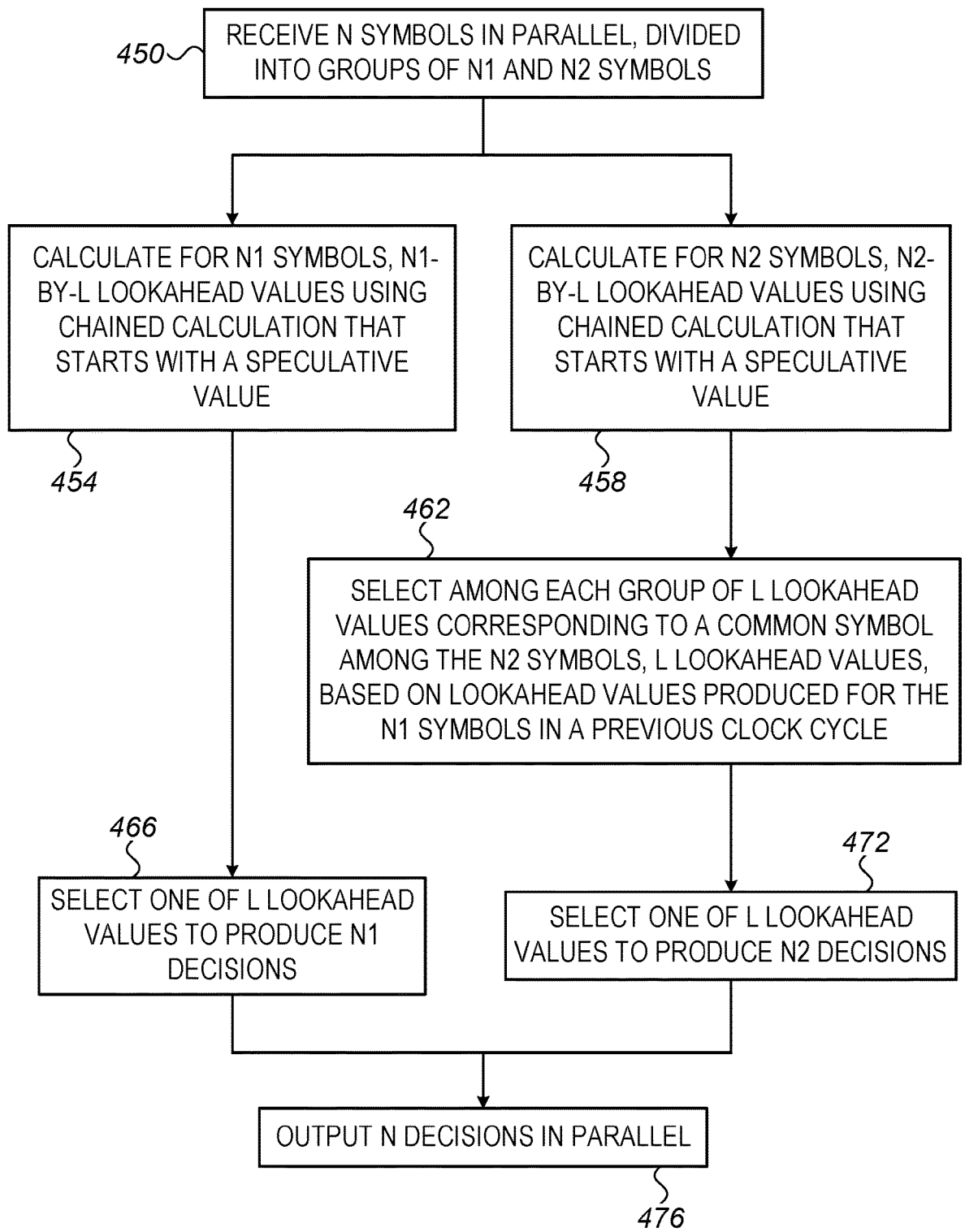
FIG. 7 is a flow chart that schematically illustrates a method for equalization using a DFE, in accordance with an embodiment that is described herein.

FIG. 7 is a flow chart that schematically illustrates a method for equalization using a DFE, in accordance with an embodiment that is described herein.

The method will be described as executed by DFE 100 of FIG. 2.

The method begins with DFE 100 receiving N input symbols in parallel, at a reception step 450. The N symbols are divided into two groups of N1 and N2 symbols, wherein N1+N2=N. Note a chained calculation applied separately on N1 and N2 lookahead values, meets a common timing constraint that is not met by the chained calculation performed on N lookahead values.

Next, the processing is split into two branches. One branch comprises steps 454 and 456, whereas the other branch comprises steps 458, 462 and 472.

At an N1 lookahead calculation step 454, N1·L lookahead modules 108 belonging to L respective processing blocks 104, produce for the N1 symbols, N1-BY-L lookahead values. The chained lookahead calculation along N1 lookahead modules in a common processing block starts with one of L combinations of speculative values.

At an N2 lookahead calculation step 458, N2·L lookahead modules belonging to L respective processing blocks, produce for the N2 symbols, N2-BY-L lookahead values. The chained lookahead calculation along N2 lookahead modules in a common processing block starts with one of L combinations of speculative values. Steps 454 and 458 are carried out in parallel.

At a mid-selection step 462, the DFE selects (using multiplexers 144) among each group of L lookahead values corresponding to a common symbol among the N2 symbols, L lookahead values, based on lookahead values produced for the N1 symbols in a previous clock cycle.

At an N1 final selection step 466, the DFE selects (using multiplexers 146A) one of the L lookahead values of step 454 to produce N1 decision values. At an N2 final selection step 472, the DFE selects (using multiplexers 146B) one of the L lookahead values of step 462 to produce N2 decision values. Steps 466 and 472 are carried out in parallel.

At an output step 476, following steps 466 and 472, the DFE outputs N=N1+N2 output decisions, and the method terminates.

The configurations of equalizer 20 of FIG. 1, of DFE 100 of FIG. 2 and of DFE 200 of FIG. 3 are example configurations, which are chosen purely for the sake of conceptual clarity. In alternative embodiments, any other suitable equalizer and DFE configurations can also be used. Elements that are not necessary for understanding the principles of the present invention, such as various interfaces, addressing circuits, timing and sequencing circuits and debugging circuits, have been omitted from the figure for clarity.

Some elements of equalizer 20, DFE 100 and DFE 200 may be implemented in hardware, e.g., in one or more Application-Specific Integrated Circuits (ASICs) or FPGAs.

The embodiments that were described above are given by way of example, and other suitable embodiments can also be used. For example, although each of DFE 100 and DFE 200 was described as an individual equalizer, in other embodiments, each of DFE 100 and DFE 200 may serve as a DFE part of an equalizer that also comprises a FFE part.

Although the embodiments above were described using specific parameters such as the number of input symbols for parallel processing, and the number of taps per FB filter, the embodiments may be implemented with other suitable parameters, in a similar manner.

The disclosed embodiments employ efficient parallel DFE architecture that can be used in high-speed communication applications requiring fast and low-cost DFE equalization at the receiver side.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Decision Feedback Equalizer (DFE) for filtering a first plurality of symbols, the DFE comprising:
multiple processing blocks, each processing block comprising a respective second plurality, smaller than the first plurality, of lookahead modules, wherein the processing blocks are arranged in groups of a third plurality of processing blocks, and wherein each processing block in a group is configured to:
receive (i) a second plurality of symbols selected for the group from among the first plurality of the symbols, and (ii) a predefined speculative value of a DFE output;
produce, based on the second plurality of the symbols and on the predefined speculative value, a second plurality of respective lookahead values, wherein a fourth plurality that equals the second plurality minus one, of the lookahead values, are used in a chained calculation that meets a timing constraint that is not met by the chained calculation performed on the first plurality of the lookahead values; and
selection logic, configured to select one of the third plurality of the lookahead values in each group of the third plurality of the processing blocks for each of the second plurality of the symbols, and to output a first plurality of the selected lookahead values in parallel.

2. The DFE according to claim 1, wherein the lookahead modules are preceded by respective Feed Forward (FF) filters, configured to filter received symbols for producing respective FF-filtered symbols, and wherein each of the lookahead modules is configured to produce a lookahead value based on the FF-filtered symbol.

3. The DFE according to claim 1, wherein the selection logic comprises first selection logic assigned to a first group of the third plurality of the processing blocks, and second selection logic assigned to a second group of the third plurality of the processing blocks, wherein the second selection logic is configured to produce from lookahead values produced by the processing blocks of the second group, intermediate lookahead values, based on lookahead values produced by the processing blocks of the first group.

4. The DFE according to claim 1, wherein each lookahead module comprises a Feed Back (FB) filter, an adder, and a decision element, wherein the FB filter is configured to receive one or more inputs, each input comprising a speculative value or a lookahead value, and filter the one or more inputs to produce a FB-filtered value, the adder is configured to calculate an equalized value by subtracting the FB-filtered value from an input symbol, and the decision element is configured to produce from the equalized value a lookahead value having one of multiple predefined decision values.

5. The DFE according to claim 4 wherein the third plurality depends on a number of taps of the FB filter and on a number of decision values supported by the decision element.

6. The DFE according to claim 4, wherein the FB filter comprises a nonlinear filter having a nonlinear response function.

7. The DFE according to claim 4, wherein the FB filter is implemented based on Volterra series or on a Wiener-Hammerstein model.

8. The DFE according to claim 4, wherein the FB filter comprises one or more Lookup Tables (LUTs) that store calculated filtered values for respective input combinations, and wherein the FB filter is configured to filter a speculative value or a lookahead value by accessing the one or more LUTs.

9. The DFE according to claim 8, wherein the DFE comprising a FB filter updater, configured to adapt a response function of the FB filter to minimize Inter-Symbol Interference (ISI) and distortion effects that may change over time, by modifying content of the one or more LUTs.

10. A method for Decision Feedback Equalizer (DFE) based filtering of a first plurality of symbols, in a DFE that comprises multiple processing blocks, each processing block comprising a respective second plurality, smaller than the first plurality, of lookahead modules, wherein the processing blocks are arranged in groups of a third plurality of processing blocks, the method comprising:
  receiving, by each processing block in a group (i) a second plurality of symbols selected for the group from among the first plurality of the symbols, and (ii) a predefined speculative value of a DFE output;
  producing, based on the second plurality of the symbols and on the predefined speculative value, a second plurality of respective lookahead values, wherein a fourth plurality that equals the second plurality minus one, of the lookahead values, are used in a chained calculation that meets a timing constraint that is not met by the chained calculation performed on the first plurality of the lookahead values; and
  selecting, using selection logic, one of the third plurality of the lookahead values in each group of the third plurality of processing blocks for each of the second plurality of the symbols, and outputting a first plurality of selected lookahead values in parallel.

11. The method according to claim 10, wherein the lookahead modules are preceded by respective Feed Forward (FF) filters that filter received symbols for producing respective FF-filtered symbols, and wherein producing the lookahead values comprises producing a lookahead value based on a respective FF-filtered symbol.

12. The method according to claim 10, wherein the selection logic comprises first selection logic assigned to a first group of the third plurality of the processing blocks, and second selection logic assigned to a second group of the third plurality of the processing blocks, wherein selecting the one of the third plurality of the lookahead values comprises producing by the second selection logic, from lookahead values produced by the processing blocks of the second group, intermediate lookahead values, based on lookahead values produced by the processing blocks of the first group.

13. The method according to claim 10, wherein each lookahead module comprises a Feed Back (FB) filter, an adder, and a decision element, wherein producing a lookahead value comprises receiving by the FB filter one or more inputs, each input comprising a speculative value or a lookahead value, and filtering the one or more inputs to produce a FB-filtered value, calculating by the adder an equalized value by subtracting the FB-filtered value from an input symbol, and producing by the decision element, from the equalized value, a lookahead value having one of multiple predefined decision values.

14. The method according to claim 13 wherein the third plurality depends on a number of taps of the FB filter and on a number of decision values supported by the decision element.

15. The method according to claim 13, wherein the FB filter comprises a nonlinear filter having a nonlinear response function.

16. The method according to claim 13, wherein the FB filter is implemented based on Volterra series or on a Wiener-Hammerstein model.

17. The method according to claim 13, wherein the FB filter comprises one or more Lookup Tables (LUTs) that store calculated filtered values for respective input combinations, and comprising filtering, by the FB filter, a speculative value or a lookahead value by accessing the one or more LUTs.

18. The method according to claim 17, wherein the DFE comprising a FB filter updater, and comprising adapting a response function of the FB filter, using the FB adapter, to minimize Inter-Symbol Interference (ISI) and distortion effects that may change over time, by modifying content of the one or more LUTs.

* * * * *